US007322087B1

(12) United States Patent
Hu

(10) Patent No.: US 7,322,087 B1
(45) Date of Patent: Jan. 29, 2008

(54) BEARING INSTALLING AND REMOVING TOOL

(76) Inventor: Chih Kuo Hu, No.28, Lane 237, Wucyuan 5th St., West District, Taichung City 403 (TW)

( * ) Notice: Subject to any disclaimer, the term of this patent is extended or adjusted under 35 U.S.C. 154(b) by 0 days.

(21) Appl. No.: 11/709,706

(22) Filed: Feb. 23, 2007

(51) Int. Cl.
*B23P 19/04* (2006.01)

(52) U.S. Cl. ............................ 29/261; 29/255; 29/262

(58) Field of Classification Search .................. 29/261, 29/262, 255, 260, 263, 256, 259
See application file for complete search history.

(56) References Cited

U.S. PATENT DOCUMENTS 6,895,646 B1 * 5/2005 Houg .......................... 29/252
7,047,609 B2 * 5/2006 Hu et al. ...................... 29/261
7,117,573 B1 * 10/2006 Hu ............................. 29/261
7,216,409 B1 * 5/2007 Chiu et al. .................... 29/259

* cited by examiner

*Primary Examiner*—Lee D. Wilson
(74) *Attorney, Agent, or Firm*—Rosenberg, Klein & Lee

(57) ABSTRACT

A bearing installing and removing tool includes a driving unit and a link unit, wherein the driving unit has a threaded rod on which an adjusting member of a connection frame is threadedly mounted. The connection frame has a guide rail and a pivotable portion so as to be connected with different types of pull assemblies or link units to have different functions. A pull unit may be connected with the threaded rod so as to remove a bearing located in a tubular shaft. A connection unit may be connected with the threaded rod and includes a connection piece with a bowl-shaped space so as to be connected with a bowl-shaped head of a bolt such that the bolt provides an adjusting function to mount a bearing to a shaft whole improve poor eccentricity between the bearing and the shaft is existed.

23 Claims, 13 Drawing Sheets

BEARING INSTALLING AND REMOVING TOOL

FIELD OF THE INVENTION

The present invention relates to a bearing installing and removing tool which is able to install a bearing to a shaft or to remove a bearing from a shat by selective parts.

BACKGROUND OF THE INVENTION

A conventional bearing installing tool 9 is shown in FIG. 10 and generally includes a threaded rod 91 having a driving end 911 at a first end thereof and a driving unit 93 is threadedly mounted to the threaded rod 91 so as to drive a connection member 92. The connection member 92 has a plurality of push rods 94. A spring 95 is mounted to the threaded rod 91 and located at a second end of the threaded rod 91, the spring 95 pushes the connection member 92 back to its original position. A connection unit 96 is connected to the second end of the threaded rod 91 so as to be connected with a shaft 97. When operation, the user rotates the driving end 911 to move the connection member 92 toward the shaft 97 and the push rods 94 push a bearing 98 to be installed on the shaft 97 so that the bearing 98 is forced to be mounted on the shaft 97. However, this requires the driving unit 93 to have a longer force arm which is not allowed to be operated in a narrow space.

FIGS. 11 and 12 shows another bearing installing tool 8 which includes a threaded rod unit 81 which is driven by a hydraulic driving device and the threaded rod unit 81 includes an extension rod 811 which extends by the hydraulic driving device. A tube 82 with a plurality of slots 821 is connected to the threaded rod unit 81 and the tube 82 has a threaded hole 822 in an underside thereof so as to be connected with a bolt 84 which is removably connected with a connection member 83 and the connection member 83 is fixed on a shaft 85. A slidable frame 86 is slidably engaged with the tube 82 and includes extensions 862 which are movably engaged with the slots 821. The slidable frame 86 includes a through hole 861 in which the extension rod 811 extends and a spring 88 is located between an inner end of the tube 82 and the slidable frame 86. Each of the extensions 862 is connected with a push rods 87 which can be connected with a link 871 to increase the length thereof when needed. A locking ring 89 is mounted to a top of the tube 82.

When in use, the connection member 83 is connected to the shaft 85 and the tube 82 is connected to the connection member 83 by the bolt 84. The pushrods 87 are located around the shaft 85 and in contact with the bearing 851 so that when the extension rod 811 extends from the threaded rod 81, the bearing 851 are mounted to the shaft 85. However, the bearing installing tool can only be used to install the bearing to the shaft.

When removing a bearing from a shaft, a bearing removing tool 7 is needed which is disclosed in FIG. 13 and includes a threaded rod 71 with a driving end 711 at first end thereof and the threaded rod 71 extends through a tube 73 which has a plurality of arms 731. A wing nut 72 is threadedly mounted to the threaded rod 71. A connection frame 74 is connected to the threaded rod 71 and includes connection rods 741 which are located alternatively to the arms 731. Each connection rod 71 has a pivotable portion 742 which is pivotably connected to an end of a claw 75. A movable frame 76 is connected to the tube 73 and located away from the wing nut 72. A plurality of support arms 77 extend from the movable frame 76 and a link 78 is pivotably connected between each support arm 77 and a mediate portion of the claw 75. The movable frame 76 has a through hole 761 through which the threaded rod 71 extends.

When in use, the wing nut 72 is rotated counter clockwise to move the tube 73 upward such that the movable frame 76 is moved upward to let the claws 75 hook the bearing which is not shown. The threaded rod 71 is then rotated to move downward to push the bearing off from the shaft.

The user has to prepare a bearing installing tool and a bearing removing tool, in other words, no such a tool that can install and remove the bearing. Besides, when the center point of the shaft is not correctly drilled, the bearing cannot be precisely connected to the shaft and this may need several times of try to mount the bearing to the shaft.

The present invention intends to provide a bearing installing and removing tool which is equipped with different parts to install or remove a bearing from a shaft.

SUMMARY OF THE INVENTION

The present invention relates to a bearing installing and removing tool comprises a driving unit having a threaded rod and a tube is mounted to the threaded rod. A locking nut is received in a recess defined in a top of the tube and the threaded rod threadedly extends through the threaded passage in the locking nut and a central hole in the tube. The tube has a plurality of extension arms extending in a direction away from the locking nut and each extension arm has an aperture defined in a distal end thereof so as to be connected with a link unit.

A connection frame is connected to an underside of the tube and has a through hole through which the threaded rod extends. A threaded hole is defined in an inner periphery of the through hole and an inner diameter of the threaded hole is larger than an inner diameter of the through hole. A plurality of legs extend radially outward from the connection frame and extend through gaps between the extension arms. Each leg has a guide rail to which the link unit is connected. Each leg has a pivotable portion at a distal end thereof so as to be connected with the link unit.

An adjusting member is located beneath the connection frame and has a threaded hole so that the threaded rod threadedly extends through the threaded hole. The adjusting member has outer threads so as to be connected with the threaded hole of the connection frame.

The primary object of the present invention is to provide a bearing installing and removing tool that is able to install a bearing to a shaft and to remove a bearing from a shaft with a replaceable unit link.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
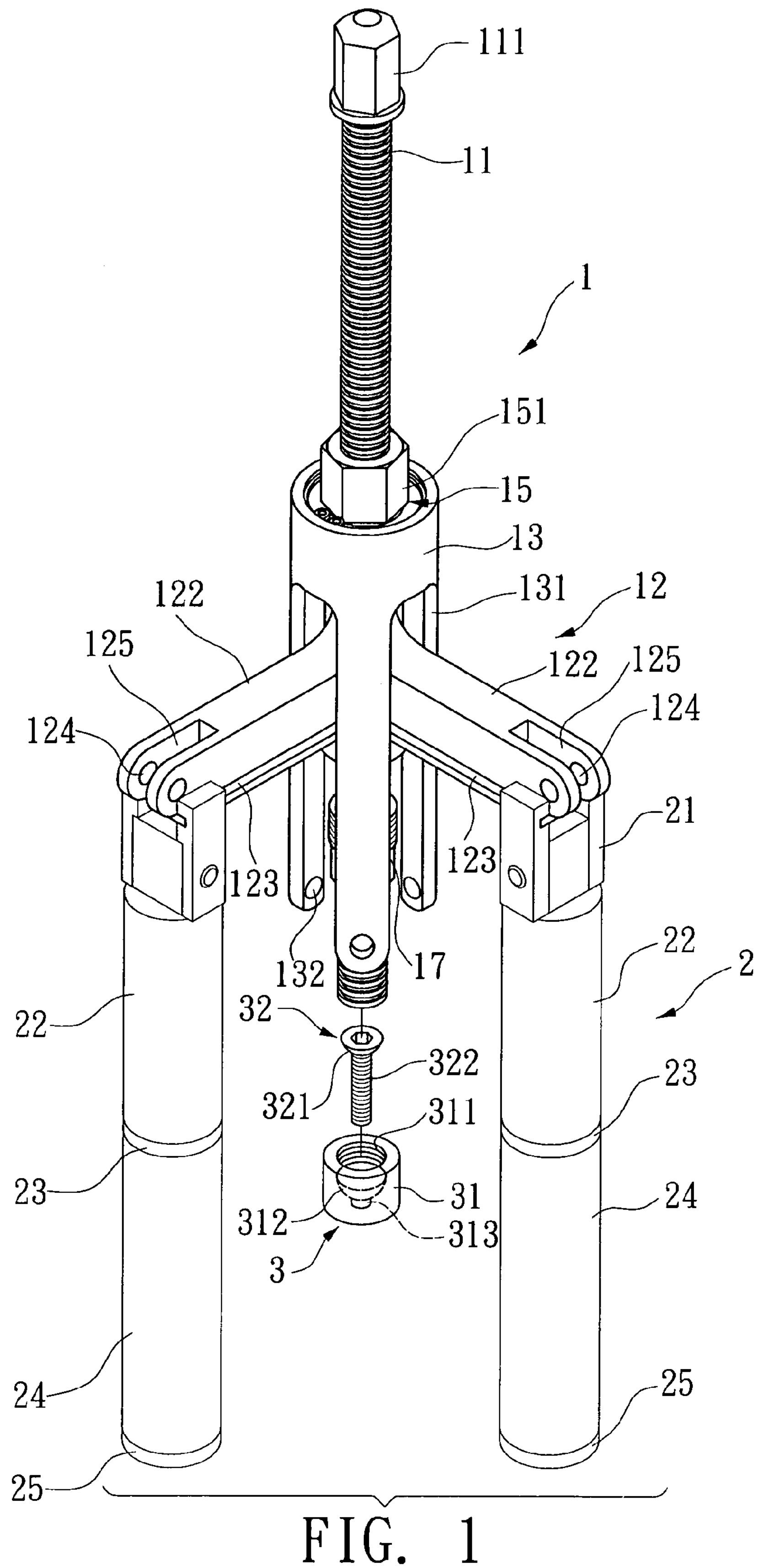
FIG. 1 is a perspective view to show the bearing installing and removing tool with the link unit of the present invention.

Referring to FIGS. 1 to 4, the bearing installing and removing tool of the present invention comprises a driving unit 1, a link unit 2 and a connection unit 3, wherein the link unit 2 is an installing device. The driving unit 1 has a threaded rod 11 which has a driving end 111 at a first end thereof such that a tool can be used to rotate the threaded rod 11 at the driving end 111 which is hexagonal section in this embodiment. A tube 13 is mounted to the threaded rod 11 and has a recess 134 defined in a top thereof and a locking nut 15 is received in the recess 134. The recess 134 includes a groove 135 defined in an inner periphery thereof so as to receive a C-clip 14 therein. A central hole 133 is defined through an inner end of the recess 134 and the locking nut 15 has a threaded passage 152. The locking nut 15 has a hexagonal section 151 and threadedly extends through the threaded passage 152 and the central hole 133. The tube 13 has a plurality of extension arms 131 extending in a direction away from the locking nut 15 and each extension arm 131 has an aperture 132 defined in a distal end thereof so as to be connected with a link unit 2. A bearing 6 is located between the locking nut 15 and the inner end of the recess 134.

A connection frame 12 is connected to an underside of the tube 13 and has a through hole 121 defined centrally therethrough so that the threaded rod 11 extends through the through hole 121. A threaded hole 126 is defined in an inner periphery of the through hole 121 and an inner diameter of the threaded hole 126 is larger than an inner diameter of the through hole 121. A plurality of legs 122 extend radially outward from the connection frame 12 and extend through gaps between the extension arms 131. Each leg 122 has a guide rail 123 to which the link unit 2 is connected, and each leg 122 has a pivotable portion 124 at a distal end thereof so as to be connected with the link unit 2. Each of the pivotable portions 214 has a slot 125 defined through an end thereof.

An adjusting member 17 is located beneath the connection frame 12 and has a threaded hole 173 so that the threaded rod 11 threadedly extends through the threaded hole 173. The adjusting member 17 has outer threads 171 in a first end thereof so as to be connected with the threaded hole 126 of the connection frame 12. A polygonal section 172 is connected to a second end of the adjusting member 17 for convenience of being cooperated with a tool.

Each link 22 of the link unit 2 includes two plates 21 and each plate 21 has a guide groove 211 with which the guide rail 123 of each leg 122 of the connection frame 12 is slidably engaged. Each plate 21 has a connection hole 212 and a bolt 26 extends through the two connection holes 212 of the two plates 21 and the link 22.

Each link 22 of the link unit 2 includes a connection end 221 which is a rectangular section and located at a first end thereof and the connection end 221. The connection end 221 has a transverse hole 222 so that the bolt 26 extends through the two respective connection holes 212 and the transverse hole 222. Each link 22 of the link unit 2 has a bottom hole 223 defined axially in a second end thereof and a mediate member 23 is connected with the bottom hole 223.

A first protrusion 231 and a second protrusion 232 extend from two opposite ends of each mediate member 23, and the first protrusion 231 is engaged with the bottom hole 223 and the second protrusion 232 is connected with an extension link 24. The extension link 24 includes an engaging hole 241 defined in a first end thereof and the second protrusion 232 is engaged with the engaging hole 241. An end piece 25 is connected to a second end of the extension link 24. The end piece 25 has a flat bottom. It is noted that the extension links 24 can be omitted and the end piece 25 can be directly connected to the bottom hole 223. The end piece 25 has an axial length which can be used as the extension link 24.

Figure 2:
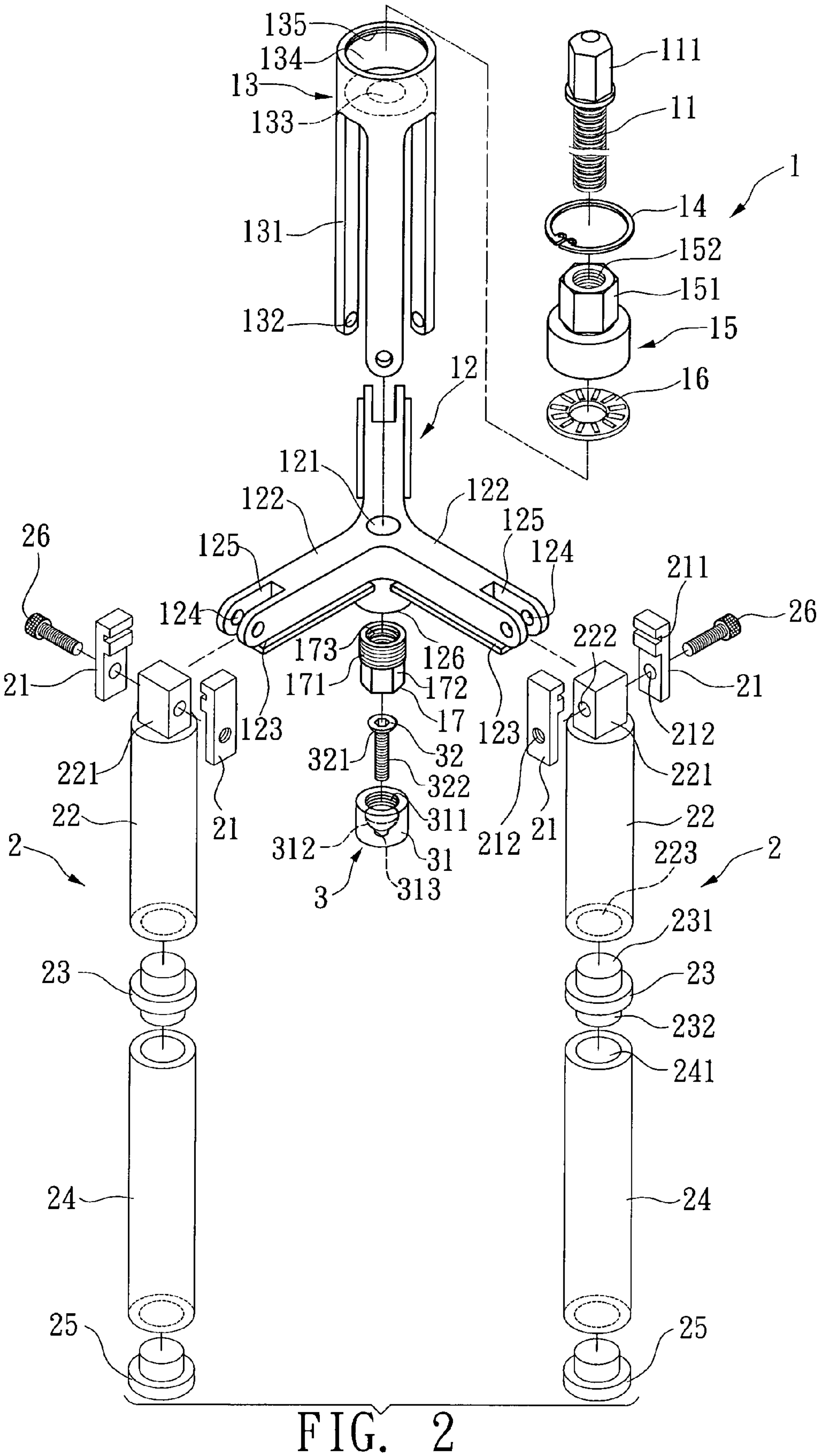
FIG. 2 is an exploded view to show the bearing installing and removing tool with the link unit of the present invention.
Figure 3:
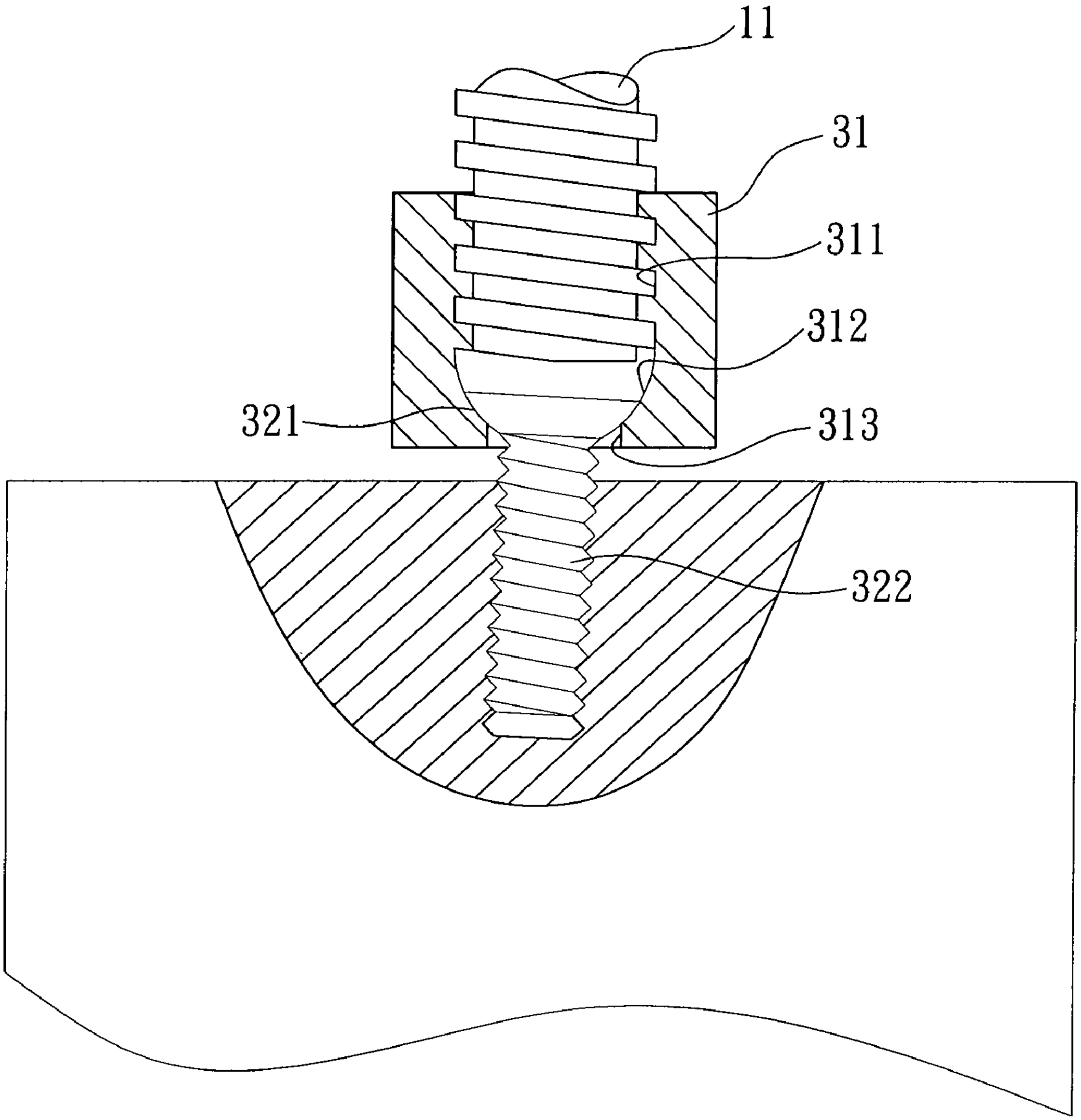
FIG. 3 shows that the bowl-shaped head of the bolt can be slightly adjusted in the bowl-shaped space of the connection piece.

Further referring to FIGS. 2 and 3, a connection unit 3 is connected to a second end of the threaded rod 11 and includes a connection piece 31 a bolt 32, the connection piece 31 has a threaded recess 311. The bolt 32 has a threaded shank 322 and a bowl-shaped head 321 is connected to an end of the threaded shank 322. The second end of the threaded rod 11 is threadedly engaged with the threaded recess 311. A bowl-shaped space 312 is defined in the connection piece 31 and located beneath the threaded recess 311. The bowl-shaped head 321 is received in the bowl-shaped space 312 and the threaded shank 322 extends through a central hole 313 defined through the connection piece 31. The central hole 313 communicates with the bowl-shaped space 312 and the threaded recess 311. The bowl-shaped head 321 is allowed to be pivotable in the bowl-shaped space 312 so that the threaded shank 322 of the bolt 32 can be positioned off the axial axis when needed.

Figure 4:
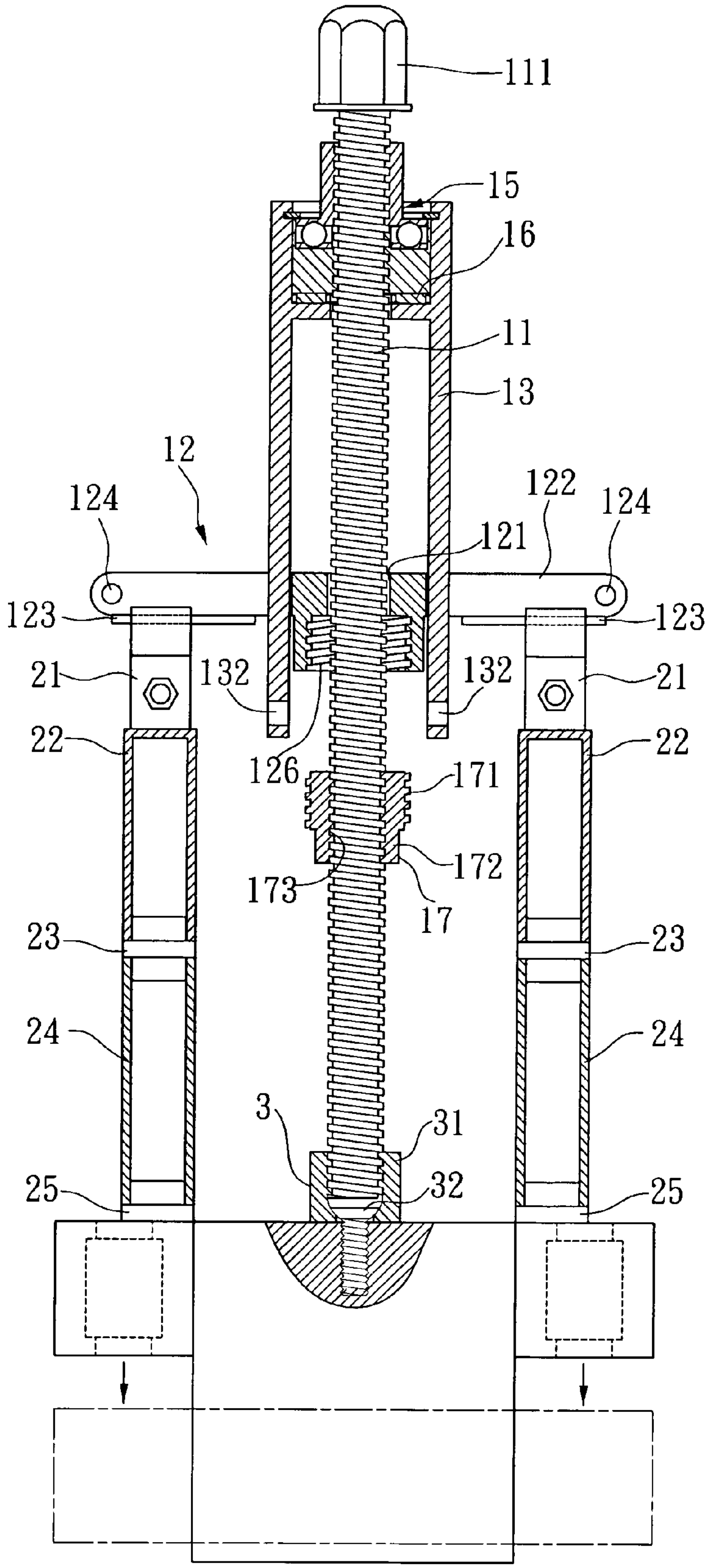
FIG. 4 is a cross sectional view to show a bearing is to be mounted to a shaft by the bearing installing and removing tool with the link unit of the present invention.

As shown in FIG. 4, when in use, the connection unit 3 is first fixed to the threaded hole in a top of the shaft to which a bearing is to be mounted thereto. The threaded rod 11 is then rotated to connect the connection unit 3 and the links 22 of the link unit 2 are connected to the guide rails 123 of the connection frame 12 and are moved toward the shaft till the links 22 are located outside of the shaft. When installing the bearing, the adjusting member 17 is first rotated to move away from the threaded hole 126 of the connection frame 12 and the locking nut 15 is then rotated to move the tube 13 to push the link unit 2 which pushes the bearing to a desired portion on the shaft.

If the bearing is to be positioned to a lower position of the shaft, the first protrusion 231 of the mediate member 23 is engaged with the bottom hole 223 of the link 22, and the second protrusion 232 of the mediate member 23 is engaged with the extension link 24. The end piece 25 is connected to a lower end of the extension link 24 so as to send the bearing to a lower position.

Figure 5:
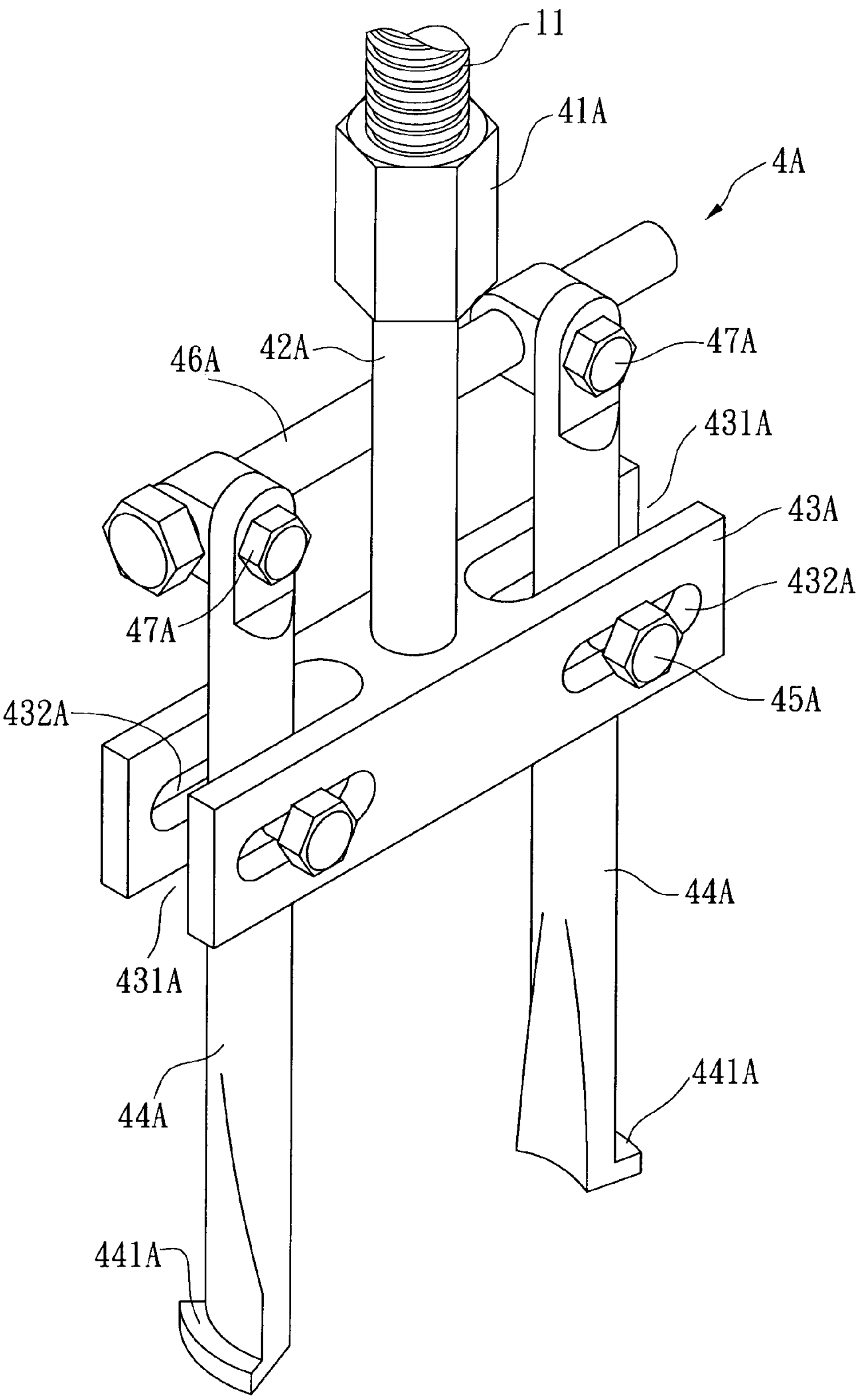
FIG. 5 shows a pull unit of the present invention.
Figure 6:
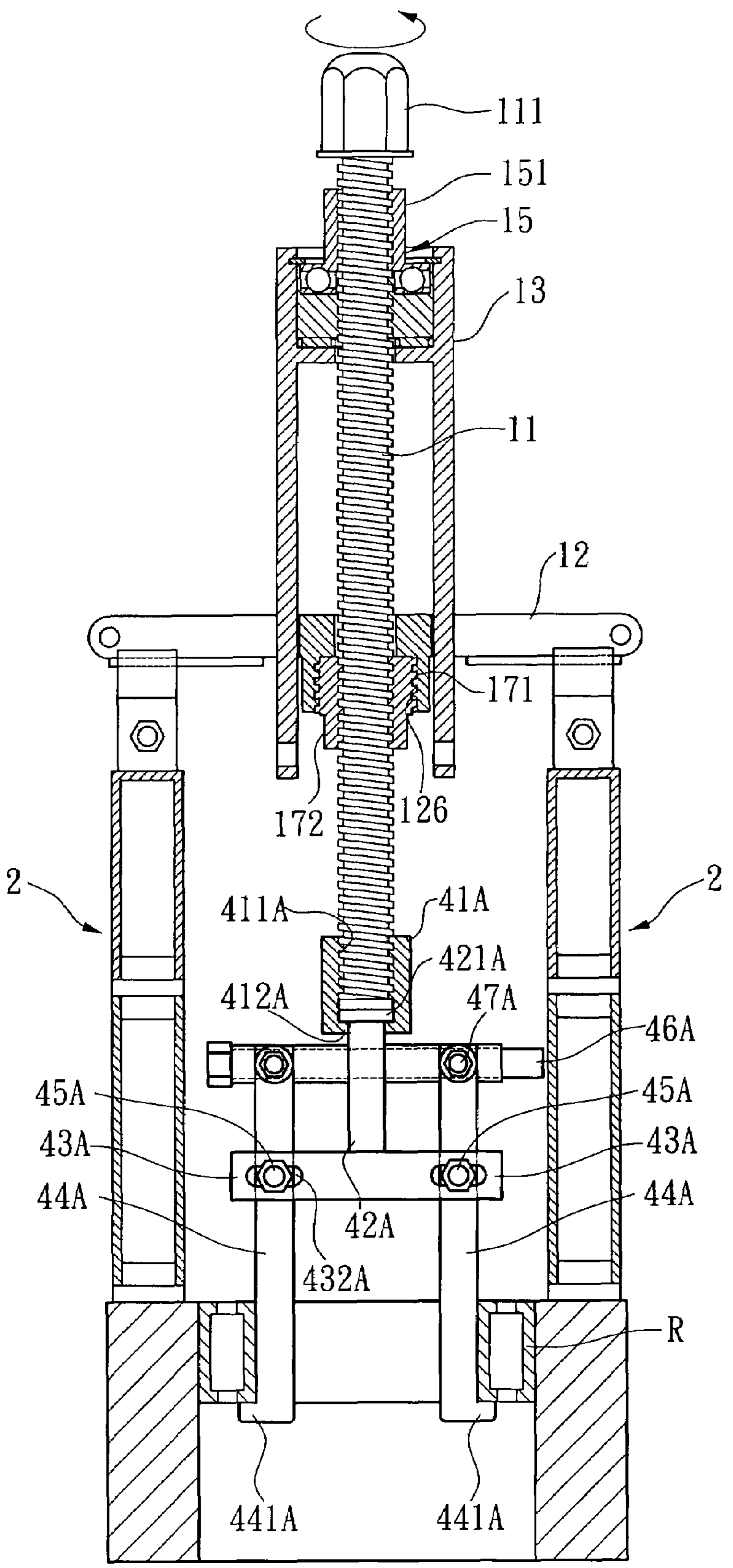
FIG. 6 shows the pull unit is connected with the tool to pull a bearing in an inner periphery of a tubular shaft.

As shown in FIGS. 5 and 6 which show another embodiment, wherein a pull unit 4A is connected to the second end of the threaded rod 11 and includes a connection nut 41A which is connected between the threaded rod 11 and a push rod 42A. A positioning member 43A is connected to the push rod 42A and two claws 44A are connected to two ends of the positioning member 43 and each claw 44A has a hook end 441A. A bar 46A is connected between the two claws 44A. Two pivots 47 are connected to two ends of the bar 46 and connected to the two claws 44A which are pivotable about the two pivots 47A. The pull unit 4A is used to remove a bearing "R" in an inner periphery of a tubular shaft.

The connection nut 41A has a threaded inner periphery 411A with which a second end of the threaded rod 11 is connected. The connection nut 41A has a receiving space 412A in which a head 421A at one end of the push rod 42A is retained. The push rod 42A is rotatable relative to the connection nut 41A so that when the connection nut 41A moves, the push rod 42A is moved toward the driving end 111 of the threaded rod 11.

The push rod 42A has a positioning member 43A and each of the two ends of the positioning member 43A includes a recess 431A which is defined by two portions and each portion has an elongate slot 432A. The two claws 44A respectively extend through the two recesses 431A and a bolt 45A extends through the elongate slots 432A and the claw 44A in the recess 431A so that the two claws 44A are movable within a rage of the elongate slots 432A. Each of the claws 44A has a hook end 441A.

As shown in FIG. 6, when removing the bearing "R" from the inner periphery of the shaft, the bolt 45A is then loosened slightly to let the claws 44A pivot about the pivots 47A till the claws 44A are inserted into the shaft to hook the bearing "R". The adjusting member 17 is then moved upward to be fixed to the threaded hole 126 of the connection frame 12 which is not moved downward. The driving end 111 of the threaded rod 11 is then rotated counter clockwise to move the connection frame 12 to contact against the shaft so as to pull the bearing "R" out from the shaft.

Figure 7:
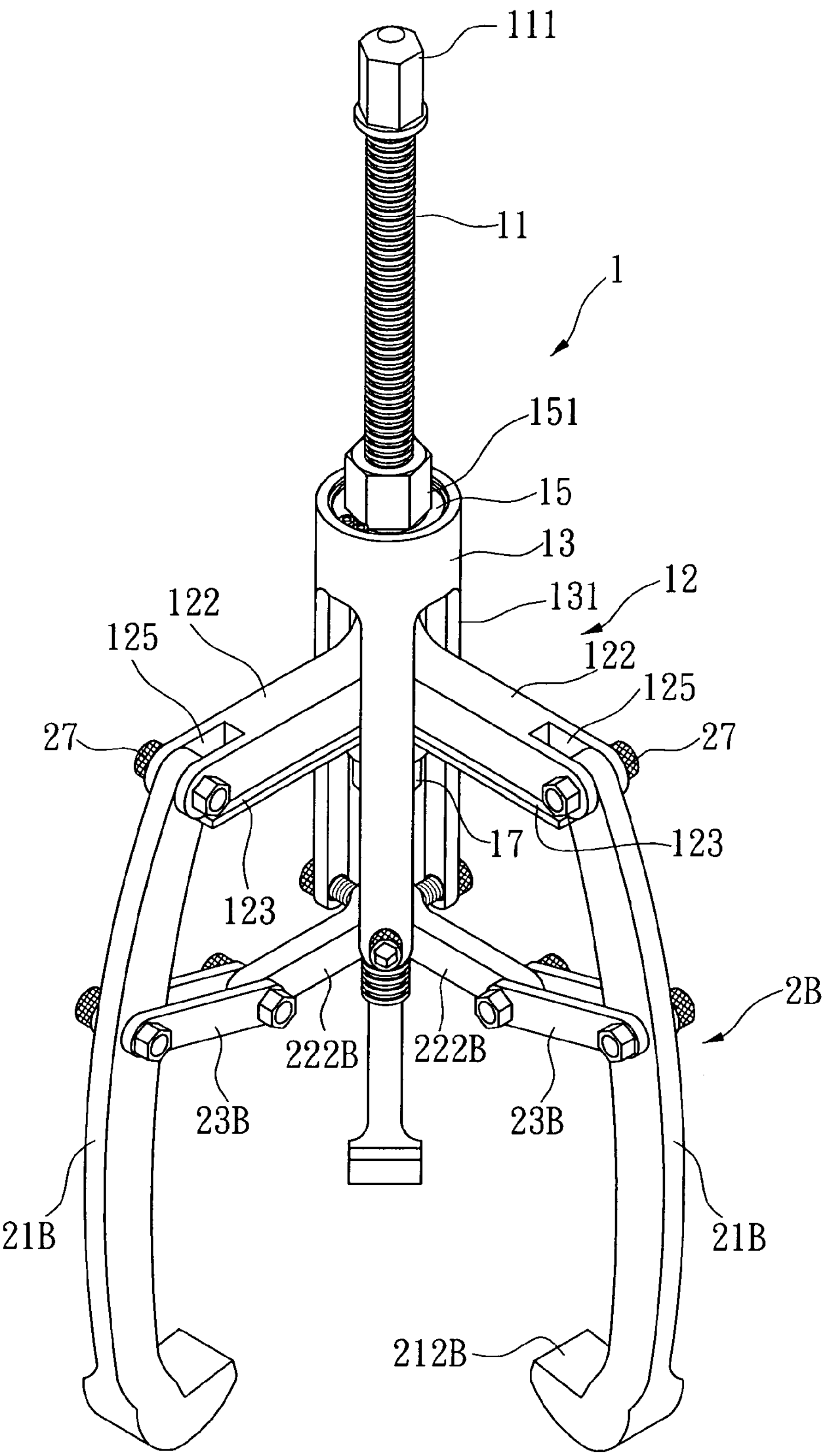
FIG. 7 is a perspective view to show a pull assembly is connected to the tool of the present invention.
Figure 8:
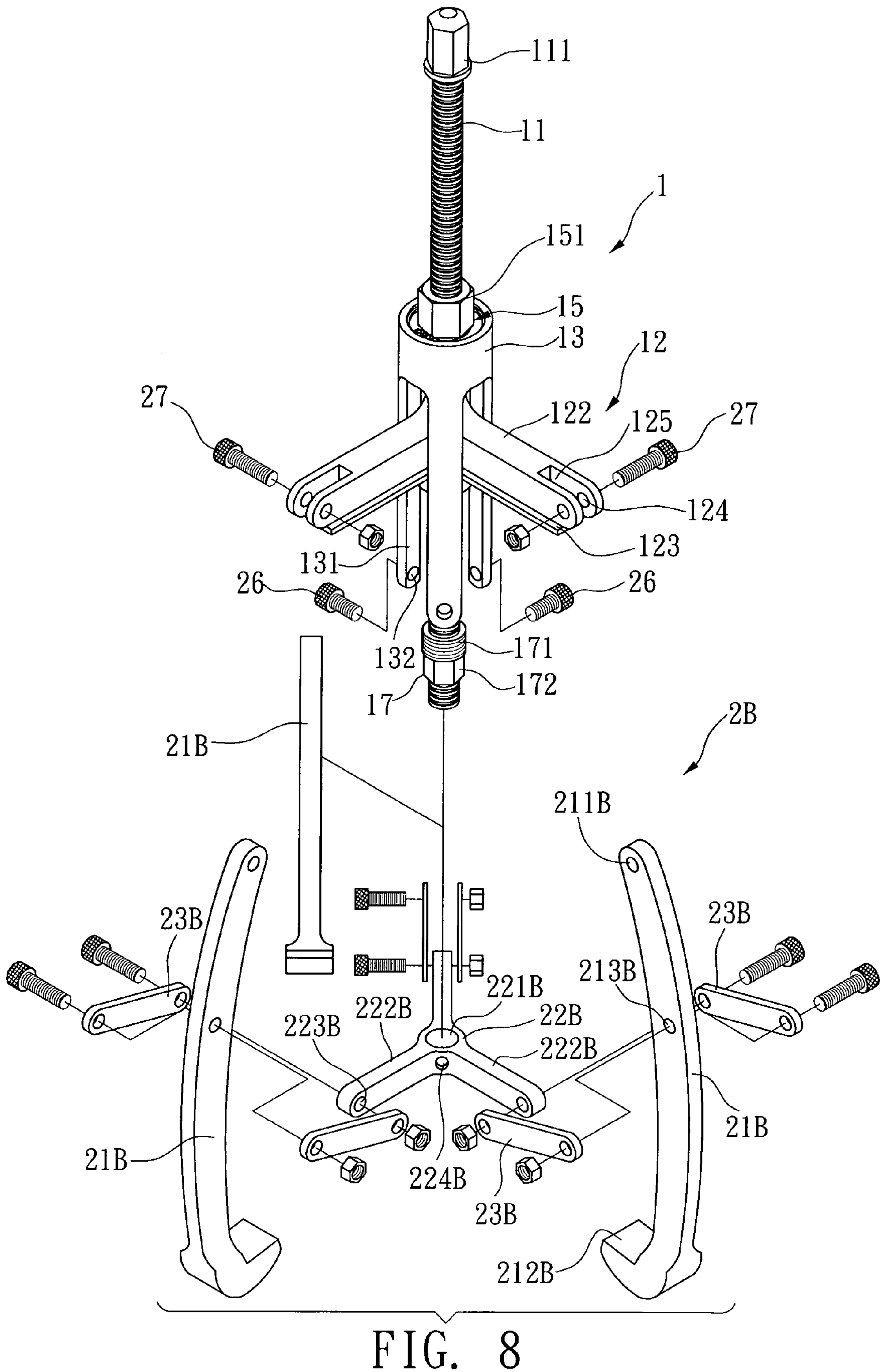
FIG. 8 is an exploded view to show the pull assembly and the tool of the present invention.
Figure 9:
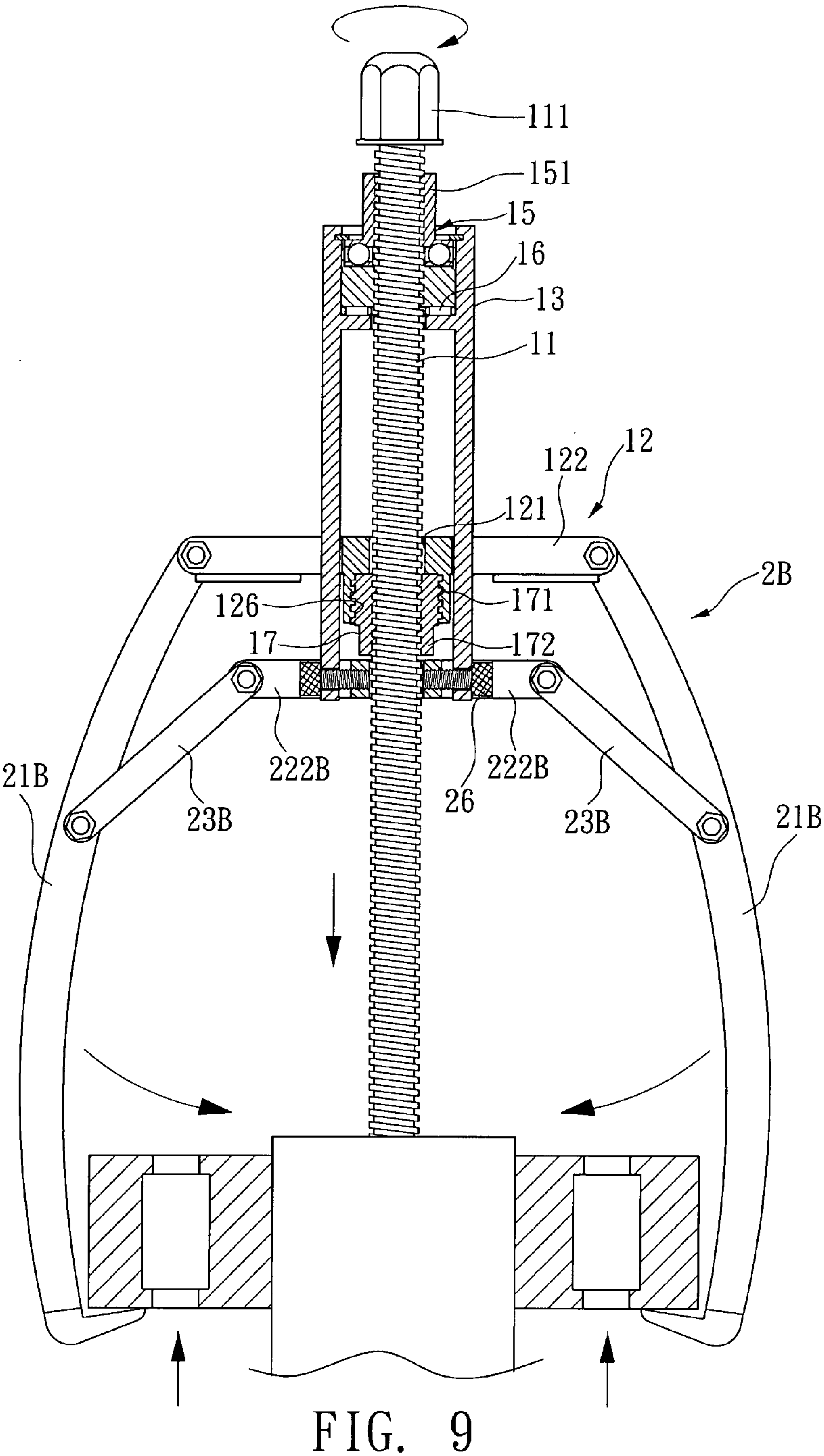
FIG. 9 shows that the pull assembly is used to pull a bearing from a shaft.
Figure 10:
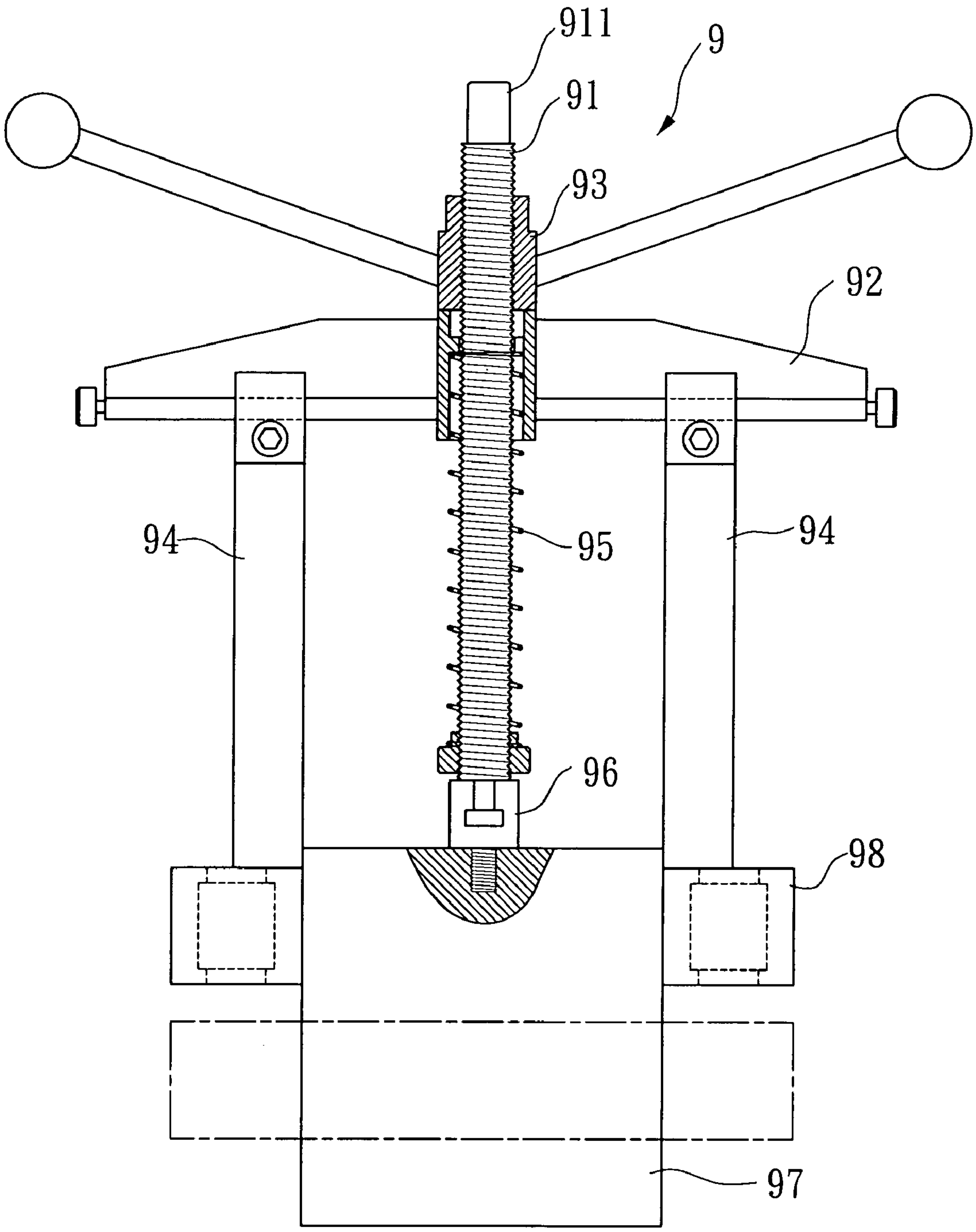
FIG. 10 PRIOR ART
FIG. 10 shows a conventional bearing installing tool.
Figure 11:
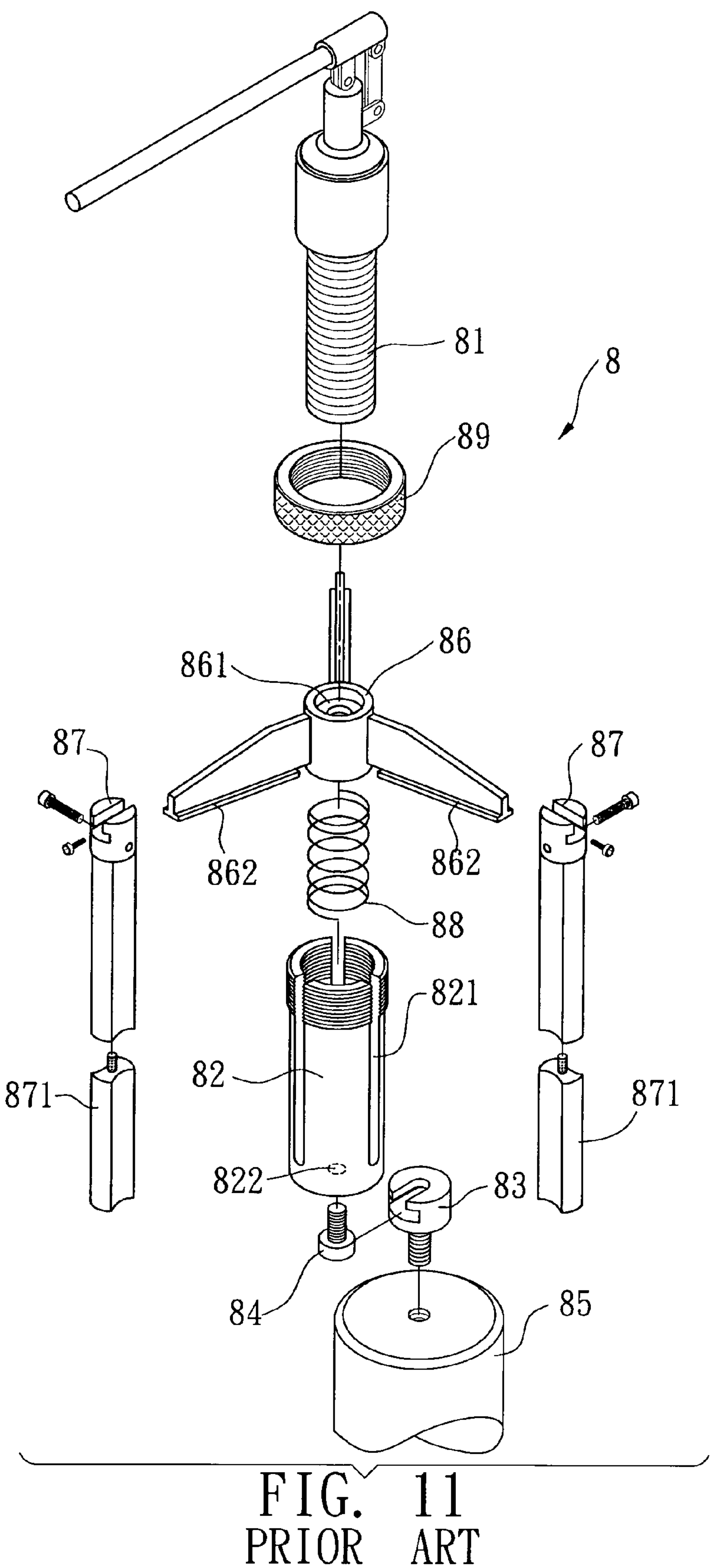
FIG. 11 PRIOR ART
FIG. 11 shows another conventional bearing installing tool.
Figure 12:
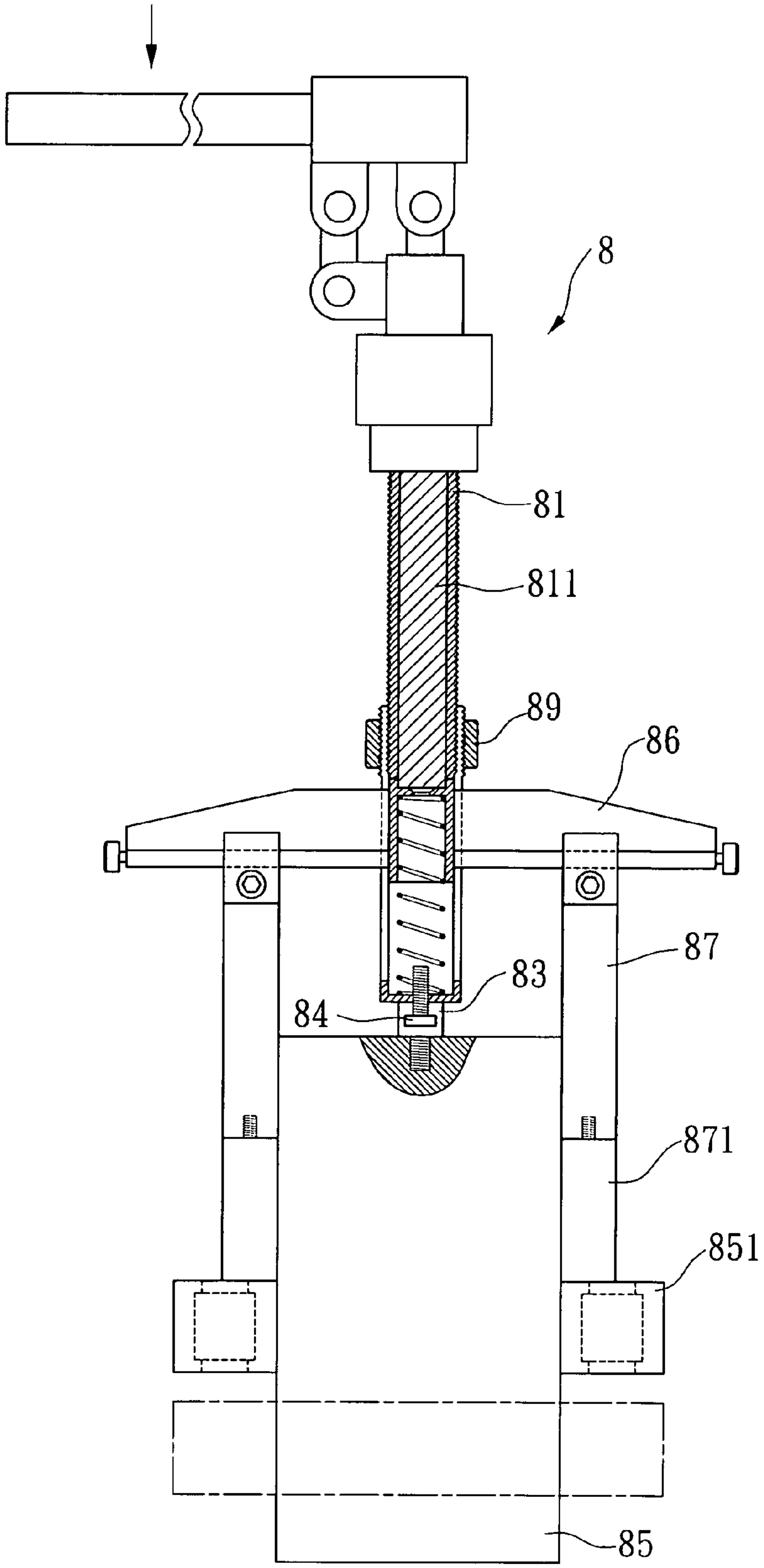
FIG. 12 PRIOR ART
FIG. 12 shows the conventional bearing installing tool in FIG. 11 is used to mount a bearing to a shaft.
Figure 13:
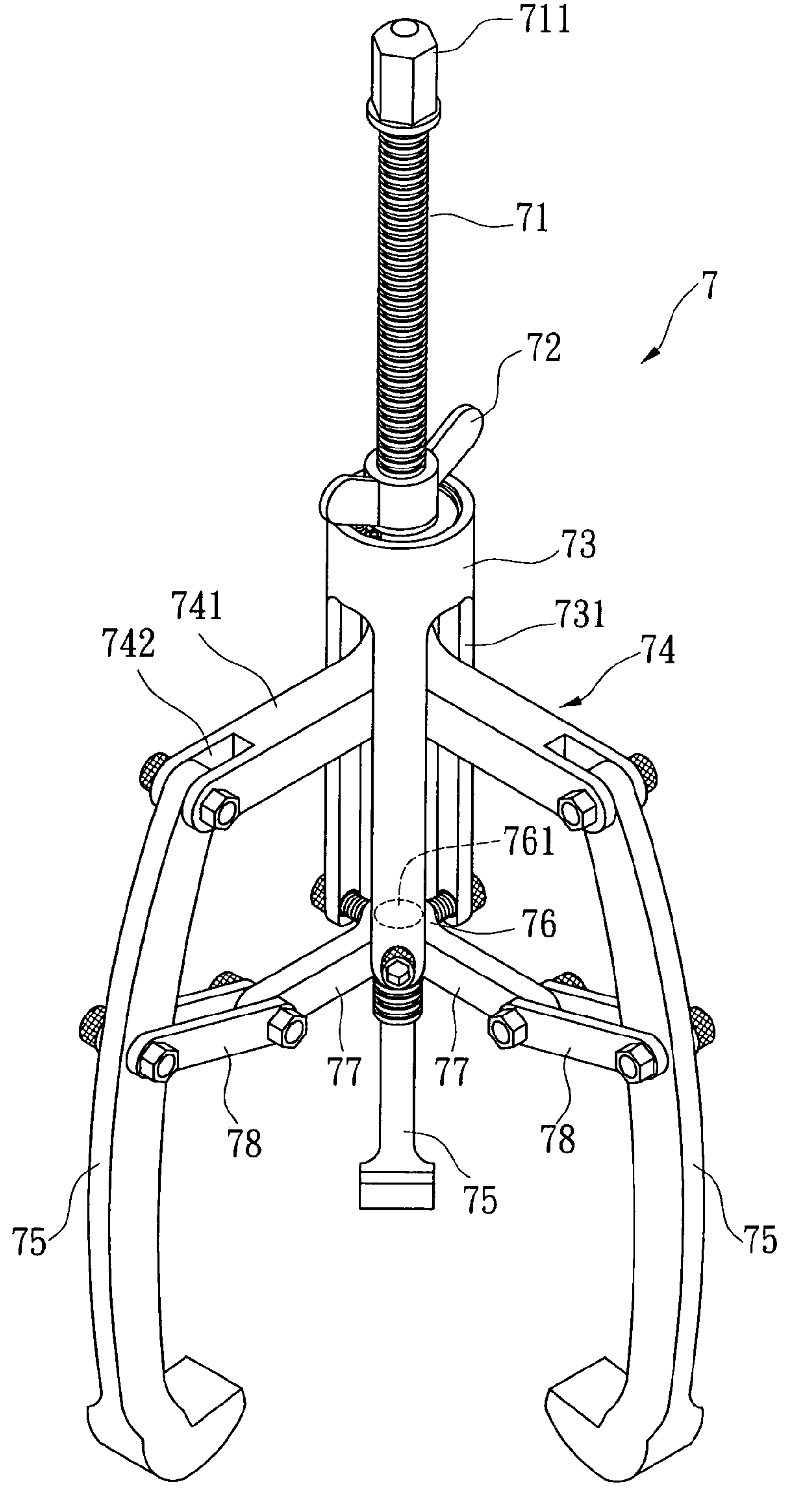
FIG. 13 PRIOR ART
FIG. 13 shows a conventional bearing removing tool.

As shown in FIGS. 7 to 9, the link unit 2 is replaced by the pull assembly 2B, wherein the pull assembly 2B includes a plurality of claws 21B and each claw 21B has a pivot hole 211B at a first end thereof so that the pivotable portion 124 of the connection frame 12 is pivotably connected to the pivot hole 211B by a bolt 27. A hook end 212B is formed at a second end of each claw 21B and a mediate hole 213B is defined in each claw 21B and located between the pivot hole 211B and the hook end 212B. A movable frame 22B is connected to a second end of the threaded rod 11 and located beneath the connection frame 12. The movable frame 22B has a through hole 221B defined therethrough, a plurality of links 222B extend radially outward from the movable frame 22B and each of the links 222B is shorter than a length of each of the legs 122 of the connection frame 12. The movable frame 22B has a plurality of threaded holes 224B so that bolts 26 threadedly extend through the threaded holes 224B and are connected to the apertures 132 of the extension arms 131 of the tube 13. Each link 222B has a pivotal portion 223B defined in a distal end thereof so as to be pivotably connected with a connection plate 23 which is pivotably connected between the link 222B and the mediate hole 213B of the claw 21B.

When disengaging the connection unit 3 and connecting the pull assembly 2B to the tool, the adjusting member 17 is then moved upward to be fixed to the threaded hole 126 of the connection frame 12 which is not moved downward. The movable frame 22B is connected to the connection frame 12 by bolts 26. The connection plates 23B are then connected to the pivotal portions 223B of the movable frame 22B at respective first ends thereof. The second end of each of the connection plates 23B is then connected to the mediate hole 213B of the claw 21B corresponding thereto. The pivot hole 211B of each claw 21B is then pivotably connected to the pivotable portion 124 of the leg 122 corresponding thereto so as to install the pull assembly 2B. The slot 125 of each leg 122 provides a sufficient space for the pivotal movement of the claw 21B.

When removing the bearing from a shaft, the driving end 111 of the threaded rod 11 is rotated to move the second end of the threaded rod 11 to contact the end of the shaft, and the locking nut 15 is then rotated to move the tube 13 downward to let the connection frame 12 move relative to the movable frame 22B to allow the claws 21B to hook the bearing.

The locking nut 15 is then rotated reversely to move the tube 13 upward so that the connection frame 12 is moved relative to the movable frame 22B again so that the claws 21B securely clamp the bearing. The threaded rod 11 is then rotated clockwise to let the threaded rod 11 push the shaft and the bearing is then removed from the shaft.

Therefore, the connection unit 3 is used to install a bearing to a shaft, and the pull unit 4A is used to remove a bearing from an inner periphery of a tubular shaft. The pull assembly 2B is used to remove a bearing from a shaft.

While we have shown and described the embodiment in accordance with the present invention, it should be clear to those skilled in the art that further embodiments may be made without departing from the scope of the present invention.

What is claimed is:

1. A bearing installing and removing tool comprising:

a driving unit (1) having a threaded rod (11) which has a driving end (111) at a first end thereof and a tube (13) mounted to the threaded rod (11), the tube (13) having a recess (134) defined in a top thereof and a locking nut (15) received in the recess (134), a central hole (133) defined through an inner end of the recess (134) and the locking nut (15) having a threaded passage (152), the threaded rod (11) threadedly extending through the threaded passage (152) and the central hole (133), the tube (13) having a plurality of extension arms (131) extending in a direction away from the locking nut (15) and each extension arm (131) having an aperture (132) defined in a distal end thereof so as to be connected with a link unit (2);

a connection frame (12) connected to an underside of the tube (13) and having a through hole (121) defined centrally therethrough so that the threaded rod (11) extends through the through hole (121), a threaded hole (126) defined in an inner periphery of the through hole (121) and an inner diameter of the threaded hole (126) being larger than an inner diameter of the through hole (121), a plurality of legs (122) extending radially outward from the connection frame (12) and extending through gaps between the extension arms (131), each leg (122) having a guide rail (123) to which the link unit (2) is connected, each leg (122) having a pivotable portion (124) at a distal end thereof so as to be connected with the link unit (2), and an adjusting member (17) located beneath the connection frame (12) and having a threaded hole (173) so that the threaded rod (11 threadedly extends through the threaded hole (173), the adjusting member (17) having outer threads (171) so as to be connected with the threaded hole (126) of the connection frame (12).

2. The tool as claimed in claim 1, wherein the driving end (111) of the threaded rod (11) is a hexagonal section.

3. The tool as claimed in claim 1, wherein the recess (134) includes a groove (135) defined in an inner periphery thereof so as to receive a C-clip (14) therein.

4. The tool as claimed in claim 1, wherein the locking nut (15) has a hexagonal section (151).

5. The tool as claimed in claim 1, wherein a bearing (6) is located between the locking nut (15) and the inner end of the recess (134).

6. The tool as claimed in claim 1, wherein each of the pivotable portions (214) has a slot (125) defined through an end thereof.

7. The tool as claimed in claim 1, wherein the adjusting member (17) has a polygonal section (172).

8. The tool as claimed in claim 1, wherein each link (22) of the link unit (2) includes two plates (21) and each plate (21) has a guide groove (211) with which the guide rail (123) of each leg (122) of the connection frame (12) is slidably engaged, each plate (21) has a connection hole (212) and a bolt (26) extends through the two connection holes (212) of the two plates (21) and the link (22).

9. The tool as claimed in claim 8, wherein each link (22) of the link unit (2) includes a connection end (221) at a first end thereof and the connection end (221) has a transverse hole (222) so that the bolt (26) extends through the two respective connection holes (212) and the transverse hole (222).

10. The tool as claimed in claim 9, wherein the connection end (221) of each link (22) of the link unit (2) is a rectangular section.

11. The tool as claimed in claim 9, wherein each link (22) of the link unit (2) has a bottom hole (223) defined axially in a second end thereof and a mediate member (23) is connected with the bottom hole (223).

12. The tool as claimed in claim 11, wherein a first protrusion (231) and a second protrusion (232) extend from two opposite ends of each mediate member (23), the first protrusion (231) is engaged with the bottom hole (223) and the second protrusion (232) is connected with an extension link (24).

13. The tool as claimed in claim 12, wherein the extension link (24) includes an engaging hole (241) defined in a first end thereof and the second protrusion (232) is engaged with the engaging hole (241), an end piece (25) is connected to a second end of the extension link (24).

14. The tool as claimed in claim 13, wherein the end piece (25) has a flat bottom.

15. The tool as claimed in claim 13, wherein the end piece (25 has an axial length.

16. The tool as claimed in claim 1, wherein a connection unit (3) is connected to a second end of the threaded rod (11) and includes a connection piece (31) a bolt (32), the connection piece (31) has a threaded recess (311).

17. The tool as claimed in claim 16, wherein the bolt (32) has a threaded shank (322) and a bowl-shaped head (321) connected to an end of the threaded shank (322), the second end of the threaded rod (11) is threadedly engaged with the threaded recess (311), a bowl-shaped space (312) is defined in the connection piece (31) and located beneath the threaded recess (311), the bowl-shaped head (321) is received in the bowl-shaped space (312) and the threaded shank (322) extends through a central hole (313) defined through the connection piece (31), the central hole (313) communicates with the bowl-shaped space (312) and the threaded recess (311).

18. The tool as claimed in claim 1, wherein a pull unit (4A) is connected to a second end of the threaded rod (11) and includes a connection nut (41A) which is connected between the threaded rod (11) and a push rod (42A), a positioning member (43A) is connected to the push rod (42A) and two claws (44A) are connected to two ends of the positioning member (43) and each claw (44A) has a hook end (441A), a bar (46A) is connected between the two claws (44A).

19. The tool as claimed in claim 18, wherein each of the two ends of the positioning member (43A) includes a recess (431A) which is defined by two portions and each portion has an elongate slot (432A), the two claws (44A) respectively extend through the two recesses (431A) and a bolt (45A) extends through the elongate slots (432A) and the claw (44A) in the recess (431A) so that the two claws (44A) are movable within a rage of the elongate slots (432A).

20. The tool as claimed in claim 18, wherein the connection nut (41A) has a receiving space (412A) in which a head (421A) at one end of the push rod (42A) is retained, the push rod (42A) is rotatable relative to the connection nut (41A) so that when the connection nut (41A) moves, the push rod (42A) is moved toward the driving end (111) of the threaded rod (11).

21. The tool as claimed in claim 18, wherein two pivots (47) are connected to two ends of the bar (46) and connected to the two claws (44A) which are pivotable about the two pivots (47A).

22. The tool as claimed in claim 18, wherein the connection nut (41A) has a threaded inner periphery (412A) with which a second end of the threaded rod (11) is connected.

23. The tool as claimed in claim 1, wherein the pull assembly (2B) includes a plurality of claws (21B) and each claw (21B) has a pivot hole (211B) at a first end thereof so that the pivotable portion (124) of the connection frame (12) is pivotably connected to the pivot hole (211B), a hook end (212B) is formed at a second end of each claw (21B) and a mediate hole (213B) is defined in each claw (21B) and located between the pivot hole (211B) and the hook end (212B), a movable frame (22B) is connected to a second end of the threaded rod (11) and located beneath the connection frame (12), the movable frame (22B) has a through hole (221B) defined therethrough, a plurality of links (222B) extend radially outward from the movable frame (22B) and each of the links (222B) is shorter than a length of each of the legs (122) of the connection frame (12), the movable frame (22B) has a plurality of threaded holes (224B) so that bolts (26) threadedly extend through the threaded holes (224B) and are connected to the apertures (132) of the extension arms (131) of the tube (13), each link (222B) has a pivotal portion (223B) defined in a distal end thereof so as to be pivotably connected with a connection plate (23) which is pivotably connected between the link (222B) and the mediate hole (213B) of the claw (21B).

* * * * *